Patented Apr. 11, 1939

2,154,389

UNITED STATES PATENT OFFICE 2,154,389

STABILIZATION OF VINYL COMPOUNDS

Sylvia M. Stoesser, Midland, Mich., assignor to
The Dow Chemical Company, Midland, Mich.,
a corporation of Michigan No Drawing. Application December 17, 1937,
Serial No. 180,329

6 Claims. (Cl. 23—250)

This invention concerns the stabilization against polymerization of vinyl compounds, particularly vinyl esters and aromatic vinyl compounds, and it also concerns the stabilized compositions comprising such compounds.

It is well-known that styrene, vinyl acetate and other vinyl compounds polymerize quite rapidly on standing at room temperature and even more rapidly when warmed or exposed to light. For instance, styrene, which in monomeric form is a thin mobile liquid, polymerizes to a thick viscous liquid during storage for three months in the dark at room temperature. An equal amount of polymerization occurs when styrene is exposed to ordinary daylight at room temperature for only three weeks. Longer storage under either of the conditions just mentioned results in further polymerization with eventual formation of a tough impervious mass which may be difficult to remove from containers and is otherwise inconvenient to handle.

Due to this tendency toward polymerization, storage and shipment of monomeric vinyl compounds in a form satisfactory for subsequent utilization has been a difficult problem. A number of substances have been known which when added to vinyl compounds would inhibit polymerization of the latter but many such substances cannot thereafter be removed conveniently to recover the vinyl compound in substantially pure and readily polymerizable condition.

An object of this invention is to provide certain new agents for the stabilization of styrene or other vinyl compound which may readily be removed to recover the vinyl compound in substantially pure, colorless and readily polymerizable form. Other objects will be apparent from the following description of the invention.

I have found that certain vinyl compounds, e. g. vinyl esters and aromatic vinyl compounds, may be stabilized against polymerization by addition of a small amount of copper or iron salt of salicylic acid, e. g. cupric salicylate, ferric salicylate, cuprous salicylate and ferrous salicylate. Vinyl compounds stabilized with these salts may be stored at room temperature in the dark over long periods of time, e. g. 6 months or longer, without becoming viscous or solid. Such compositions are also relatively stable against polymerization at elevated temperatures, e. g. they may be heated or distilled under vacuum at temperatures as high as 100° C. without undergoing appreciable polymerization. Vinyl compounds stabilized against polymerization, according to the invention, may be recovered in substantially pure, colorless, and readily polymerizable form from the stabilized compositions by distillation. Moreover, since the copper and iron salts of salicylic acid are solids, substantially insoluble in the vinyl compounds, the latter may be recovered in substantially pure and readily polymerizable form from admixture with these salts by simple filtration, or decantation. Vinyl compounds which have been stabilized according to the invention are in no way changed by the stabilization treatment and, after removal of the stabilizing agent, may be polymerized to produce resins which are identical with resins prepared from unstabilized material.

Although some degree of stabilization is secured by the presence of mere traces of the new stabilization agents, the smallest practical amount will depend somewhat upon the conditions to which the stabilized compositions are to be subjected. Under ordinary conditions of storage, it is preferable to employ between 0.005 and 0.020 part by weight of stabilizing agent per part of vinyl compound, although it may become necessary to increase this amount to 0.050 part if the stabilized composition is to be stored in the light at temperatures above normal for long periods of time, or if it is to be distilled at temperatures above 100° C. The stabilizing agents may, of course, be employed in as great a proportion as desired.

The following table presents four sets of comparative experiments illustrating the use of iron and copper salicylates for the stabilization of different vinyl compounds under different conditions of storage. Each set of experiments shows the extent of polymerization of the stabilized and unstabilized vinyl compound during storage under the conditions of time and temperature stated in the table.

Table

| Vinyl compound | Stabilizing agent | Conditions of storage | Time of storage | Condition of stabilized composition |
|---|---|---|---|---|
| Styrene | None | 100° C. in dark | 3 hrs | Thick, viscous liquid. |
| Do | 1% cupric salicylate | do | 80 hrs | Thin mobile liquid; apparently unchanged. |
| Do | 1% cuprous salicylate | do | 3 hrs | Thin liquid. |
| Do | 1% ferric salicylate | do | 28 hrs | Do. |
| Do | None | 18–25° C. in dark | 18 weeks | Thick viscous liquid. |
| Do | 1% cupric salicylate | do | 20 weeks | Thin mobile liquid; apparently unchanged. |
| Do | None | 18–25° C. in light | 24 days | Very viscous liquid. |
| Do | 1% cupric salicylate | do | do | Thin mobile liquid. |
| Do | 1% ferric salicylate | do | do | Slightly viscous liquid. |
| Vinyl acetate | None | 50° C. in dark | 6 days | Thick viscous liquid. |
| Do | 0.5% cupric salicylate | do | do | Thin mobile liquid; apparently unchanged. |

Other vinyl compounds which may be stabilized according to the invention are vinyl propionate, divinyl benzene, p-ethyl styrene, vinyl butyrate, p-chlor-styrene, vinyl xylene, vinyl naphthalene, etc.

Other modes of applying the principle of my invention may be employed instead of those explained, change being made as regards the method herein disclosed, or any of the materials employed provided the step or steps stated by any of the following claims be obtained.

I therefore particularly point out and distinctly claim as my invention:

1. A polymerizable unsaturated organic compound selected from the group consisting of vinyl esters and aromatic vinyl compounds stabilized against polymerization with a salicylate of a metal selected from the group consisting of copper and iron.

2. A polymerizable unsaturated organic compound selected from the group consisting of vinyl esters and aromatic vinyl compounds stabilized against polymerization with a copper salt of salicylic acid.

3. A polymerizable unsaturated organic compound selected from the group consisting of vinyl esters and aromatic vinyl compounds stabilized against polymerization with an iron salt of salicylic acid.

4. Styrene stabilized with a salicylate of a metal selected from the group consisting of copper and iron.

5. Styrene stabilized with cupric salicylate.

6. Styrene stabilized with ferric salicylate.

SYLVIA M. STOESSER.